(12) United States Patent
Guo et al.

(10) Patent No.: US 6,864,335 B2
(45) Date of Patent: Mar. 8, 2005

(54) PROCESS FOR FORMING SOLID PRESSURE SENSITIVE ADHESIVE POLYMER MICROSPHERES

(75) Inventors: Jong-Shing Guo, Longmeadow, MA (US); Sharon D. Trembley, Chicopee, MA (US)

(73) Assignee: Surf Chip, Inc., Wilmington, DE (US)

( * ) Notice: Subject to any disclaimer, the term of this patent is extended or adjusted under 35 U.S.C. 154(b) by 103 days.

(21) Appl. No.: 09/886,729

(22) Filed: Jun. 21, 2001

(65) Prior Publication Data

US 2002/0019482 A1 Feb. 14, 2002

Related U.S. Application Data

(60) Provisional application No. 60/213,851, filed on Jun. 23, 2000.

(51) Int. Cl.[7] .................. C09J 133/02; C09J 133/06
(52) U.S. Cl. .................. 526/234; 524/422; 524/832; 524/833; 526/86; 526/318.4; 526/328.5
(58) Field of Search .................. 524/422, 832, 524/833, 556, 700, 742, 773; 526/86, 234, 318.4, 328.5, 832, 833

(56) References Cited

U.S. PATENT DOCUMENTS

| | | |
|---|---|---|
| 3,691,140 A | 9/1972 | Silver |
| 4,786,696 A | 11/1988 | Bohnel |
| 5,045,569 A | 9/1991 | Delgado |
| 5,053,436 A | 10/1991 | Delgado |
| 5,508,313 A * | 4/1996 | Delgado et al. ............... 521/63 |
| 5,514,122 A * | 5/1996 | Morris et al. ............... 604/387 |
| 5,571,617 A * | 11/1996 | Cooprider et al. .......... 428/341 |
| 5,578,650 A | 11/1996 | Delgado et al. |
| 5,656,705 A * | 8/1997 | Mallya et al. ............... 526/233 |
| 6,312,715 B1 * | 11/2001 | Cantor et al. ............... 424/448 |

* cited by examiner

Primary Examiner—Kelechi C. Egwim
(74) Attorney, Agent, or Firm—Lathrop & Gage, L.C.

(57) ABSTRACT

In forming pressure sensitive adhesive microspheres by copolymerizing a non-ionic monomer of an alkyl acrylate or alkyl methacrylate ester of a non-tertiary alcohol and an ionic monomer copolymerizable with said non-ionic monomer, non-free radically polymerizable acid is present during the polymerization to promote formation of solid rather than hollow microspheres and to reduce residual unconverted ionic monomer. These microspheres exhibit reduced adhesive transfer in downstream use as a repositionable pressure sensitive adhesive. A water soluble initiator is optionally added to the polymerization mixture after achieving about 90% conversion of the non-ionic monomer to further reduce residual unconverted ionic monomer.

2 Claims, 1 Drawing Sheet

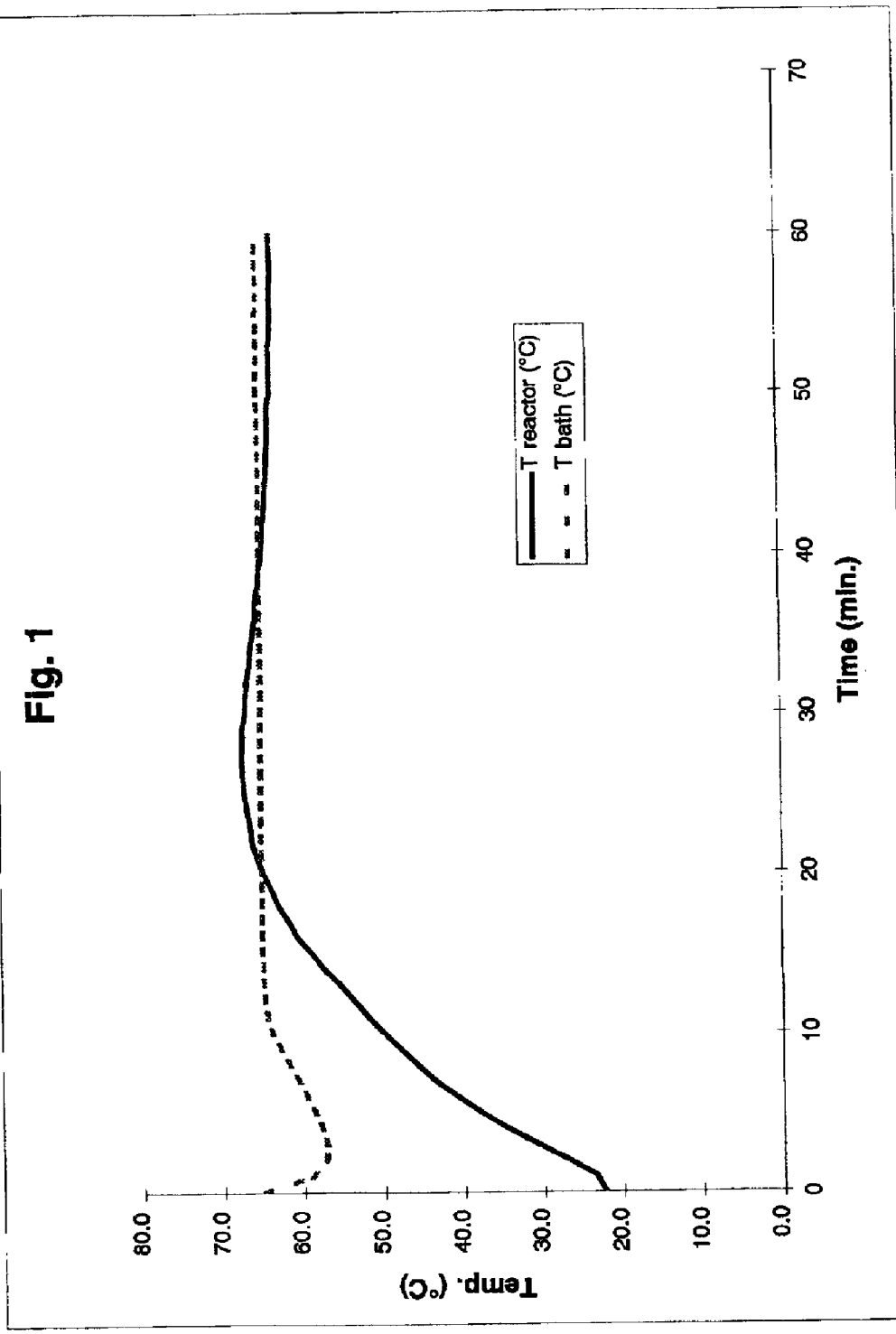

PROCESS FOR FORMING SOLID PRESSURE SENSITIVE ADHESIVE POLYMER MICROSPHERES

RELATED APPLICATION

This application is a non-provisional application which claims the priority of prior provisional application Ser. No. 60/213,851, entitled "Process For Forming Solid Pressure Sensitive Adhesive Polymer Microspheres", filed Jun. 23, 2000, which is hereby incorporated by reference into this application.

BACKGROUND OF THE INVENTION

This invention relates to a process for forming pressure sensitive polymeric microspheres, and to the solid microspheres so formed as well as their use as repositionable pressure sensitive adhesives.

Solid and hollow inherently tacky acrylate polymer microspheres are known in the art for use in repositionable pressure sensitive adhesive applications. The term "repositionable" refers to the ability to be repeatedly adhered to and removed from a substrate without substantial loss of adhesion capability.

U.S. Pat. No. 3,691,140 to Silver teaches preparation of such microspheres utilizing water soluble, substantially oil insoluble ionic monomers as components of the acrylate polymer. Amongst others of such monomers are disclosed sodium acrylate, sodium methacrylate, and ammonium acrylate. Subsequent U.S. Pat. No. 5,053,436 to Delgado discloses that the Silver '140 patent teaches that such water soluble, substantially oil insoluble ionic monomers are critical to preventing coagulation or agglomeration of the formed microspheres.

However, more recent U.S. Pat. No. 5,656,705 to Mallya et al (col. 6, "Comparative Study and (Controls 1 to 4)") in duplicating the procedure of the Silver '140 patent using sodium acrylate as ionic comonomer, found that during the polymerization essentially all the sodium acrylate was unreactive. Decreasing the level of such sodium acrylate led to reactor fouling—i.e. the instability probably ionic monomer helps to avoid.

It would be desirable to use such ionic monomer for the suspension stability function taught in the noted art without leaving a substantial quantity as unconverted monomer dissolved in the aqueous phase after polymerization. High levels of unreacted residual monomer are undesirable and, depending on monomer identity, can lead to downstream handling problems. For example, ionic acrylic acid (e.g. $NH_4$ acrylate) is hazardous to humans and quite odorous and corrosive.

With respect to microsphere loss during repositioning, microspheres are transferred from the carrier or backing layer to the substrate. When microspheres are pulled away from the carrier or backing layer, this is recognized as a post synthesis application problem in the art. Low or no microsphere transfer is desirable in order that the carrier or backing layer be able to stick to another surface after repositioning.

Many approaches are disclosed in the art to minimize microsphere adhesive transfer. These include use of special emulsifiers during a two step polymerization procedure to promote formation of hollow microspheres; use of special fine particles interspersed with the microspheres; coating the microspheres with a separate adhesive layer; use of a special adhesion-promoting co-monomer during polymerization formation of the microspheres; use of a binder material providing sockets in which the microspheres are mechanically held; use of a primer applied to the carrier or backing layer, etc.

A further need continues to exist in the art for techniques to improve the adhesive transfer performance property of inherently tacky acrylate pressure sensitive adhesive microspheres.

SUMMARY OF THE INVENTION

Now, a process has been developed providing solid (as opposed to hollow) acrylate polymer microspheres having improved transfer performance characteristics and reduced unreacted residual ionic monomer.

Accordingly, a principle object of this invention is to provide a process for forming polymeric acrylate microspheres that reduces the level of residual unconverted ionic co-monomer and improves the adhesion performance property of the microspheres.

Another object is to provide such adhesion performance improvements and reduction in residual monomer level by incorporating more of the polymerizable ionic monomer into the polymeric microspheres used in the repositionable adhesive applications.

Other objects of this invention will in part be obvious and will in part appear from the following detailed description and claims.

According to the invention, a process for preparing solid polymeric pressure sensitive adhesive microspheres is provided comprising (a) contacting a polymerizable aqueous emulsion of at least one non-ionic monomer of an alkyl acrylate or alkyl methacrylate ester of a non-tertiary alcohol and at least one ionic monomer copolymerizable with the non-ionic monomer, and at least one non-free radically polymerizable acid, and (b) polymerizing the emulsion to form an aqueous suspension of the solid polymeric pressure sensitive adhesive microspheres; wherein the non-free radically polymerizable acid is contacted with the polymerizable aqueous emulsion prior to achieving about 95% conversion of said non-ionic monomer.

Further according to the invention, a process of forming acrylic pressure sensitive adhesion microspheres is provided comprising (a) forming a polymerizable aqueous emulsion by contacting water, at least one non-ionic monomer of an alkyl acrylate or alkyl methacrylate ester of a non-tertiary alcohol, at least one ionic monomer copolymerizable with the non-ionic monomer, and at least one emulsifier, (b) initiating polymerization, (c) adding at least one non-free radically polymerizable acid, and (d) polymerizing the non-free radically polymerizable acid-containing mixture to form the solid polymeric pressure sensitive adhesive microspheres; wherein the non-free radically polymerizable acid is added to the polymerizable aqueous emulsion prior to achieving about 95% conversion of said non-ionic monomer.

Still further according to the invention, solid polymeric pressure sensitive adhesive microspheres produced by the process(es) described above are provided.

Optionally included in the process(es) of the invention is the addition of water soluble initiator to the polymerization reaction zone after achieving about 90% conversion of said non-ionic monomer to further reduce residual unconverted water soluble ionic comonomer by promoting its inclusion in the balance of the polymerization process.

BRIEF DESCRIPTION OF THE DRAWINGS

In describing the invention, reference will be made to FIG. 1 which is a graph showing the initial portion of a polymerization reaction temperature profile useful in the process of the invention that includes an exothermic phase in the polymerization process.

DETAILED DESCRIPTION OF THE INVENTION

This invention provides solid polymeric microspheres useful as repositionable pressure sensitive adhesives in the production of removable and repositionable products such as labels, note paper, tapes and the like. The solid polymeric microspheres of the invention may be applied directly to paper or other backings. As used herein, the term "solid" means microspheres containing essentially no interior voids or internal cavities having a diameter greater than 10% of the diameter of the microsphere, although there may be a detectable number of hollow or hollow-appearing microspheres in the overall microsphere product produced by the process(es) of the invention.

A first embodiment of the invention relates to a suspension polymerization process for preparing solid polymeric pressure sensitive adhesive microspheres comprising (a) contacting a polymerizable aqueous emulsion of at least one non-ionic monomer of an alkyl acrylate or alkyl methacrylate ester of a non-tertiary alcohol and at least one ionic monomer copolymerizable with the non-ionic monomer, and at least one non-free radically polymerizable acid, and (b) polymerizing the emulsion to form an aqueous suspension of the solid polymeric pressure sensitive adhesive microspheres; wherein the non-free radically polymerizable acid is contacted with the polymerizable aqueous emulsion prior to achieving about 95% conversion of said non-ionic monomer.

According to the first embodiment of the invention, the polymerizable aqueous emulsion can be prepared by contacting water, at least one non-ionic monomer of an alkyl acrylate or alkyl methacrylate ester of a non-tertiary alcohol, at least one ionic monomer copolymerizable with the non-ionic monomer, and an emulsifier.

A second embodiment of the invention relates to a suspension polymerization process for preparing solid polymeric pressure sensitive adhesive microspheres comprising (a) forming a polymerizable aqueous emulsion by contacting water, at least one non-ionic monomer of an alkyl acrylate or alkyl methacrylate ester of a non-tertiary alcohol, at least one ionic monomer copolymerizable with said non-ionic monomer, and at least one emulsifier, (b) initiating polymerization, (c) adding at least one non-free radically polymerizable acid, and (d) polymerizing the non-free radically polymerizable acid-containing mixture to form the solid polymeric pressure sensitive adhesive microspheres; wherein the non-free radically polymerizable acid is added to the polymerizable aqueous emulsion prior to achieving about 95% conversion of said non-ionic monomer.

Non-ionic monomers that can be employed according to the invention include alkyl acrylate or alkyl methacrylate esters of a non-tertiary alcohol. The alkyl groups of the alkyl acrylate or alkyl methacrylate monomers are linear or branched alkyl radicals having from 4 to about 14 carbon atoms, preferably from 4 to about 10 carbon atoms, and more preferably from 4 to about 8 carbon atoms. Such acrylates and methacrylates are oleophilic, water emulsifiable, have restricted water solubility, and as homopolymers, generally have glass transition temperatures below about −20° C. Examples of this class of monomers include, but are not limited to, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures.

The currently preferred non-ionic monomers are 2-ethylhexyl acrylate, n-butyl acrylate, and mixtures thereof, with 2-ethylhexyl acrylate being most preferred.

Ionic monomers that can be employed according to the invention are ionic monomers that are copolymerizable with the non-ionic monomer and that are water soluble and substantially oil-insoluble. By substantially oil-insoluble and water-soluble it is meant that the monomer has a solubility of less than 0.5% by weight and, a distribution ratio (D) at a given temperature (preferably 50°–65° C.), of solubility in the oil phase monomer to solubility in the aqueous phase of less than about 0.005, i.e., $$D = \frac{\text{Total concentration in organic layer}}{\text{Total concentration in aqueous layer}}$$

Such ionic monomers include alkali metal, ammonium or amine salts of an acid selected from a monoolefinic monocarboxylic acid, a monoolefinic dicarboxylic acid or mixtures thereof.

The preferred alkali metal salts are the sodium and potassium salts.

Suitable amine salts include the cations derived from any water-soluble amine-containing organic compound. Examples of suitable amine salts include, but are not limited to, cations represented by the formula $(R)_4N^+$ wherein each R is independently hydrogen, alkyl having 1–10 carbon atoms, aminoalkyl having 2–10 carbon atoms, or hydroxyalkyl having 2–10 carbon atoms, provided at least one of R is not hydrogen. $(R)_4N^+$ can be a primary, secondary or tertiary ammonium, or a quaternary ammonium. Preferably, the amine salt is triethanol-ammonium.

The currently preferred salts are the alkali metal and ammonium salts, with sodium and ammonium salts being most preferred.

Examples of suitable ionic monomers include, but are not limited to, the salts of acrylic acid, methacrylic acid, fumaric acid, maleic acid, itaconic acid, crotonic acid and mixtures thereof. The currently preferred acids are acrylic acid and methacrylic acid, with acrylic acid being most preferred.

As used in the process(es) of the invention, the ionic monomers can be added directly to the polymerization reaction mixture or can be formed in situ by adding a monoolefinic monocarboxylic acid, a monoolefinic dicarboxylic acid or mixtures thereof and a compound selected from an alkali metal hydroxide, ammonium hydroxide or an amine. When the ionic monomer is formed in situ, the non-free radically polymerizable acid is contacted with the polymerizable aqueous emulsion after formation of the ionic monomer.

The composition of the copolymer microspheres of the invention can be expressed in terms of the amounts of non-ionic monomer and ionic monomer charged to the polymerization. The amount of non-ionic and ionic monomers charged can be expressed in terms of weight percent based on the total monomer charged to the polymerization. Broadly, the monomer charged will contain about 85 to about 99.5 weight percent non-ionic monomer and about 0.5 to about 15 weight percent ionic monomer, preferably about 90 to about 99.5 weight percent non-ionic monomer and about 0.5 to about 10 weight percent ionic monomer, and more preferably about 94 to about 98 weight percent non-ionic monomer and about 2 to about 6 weight percent ionic monomer.

Non-free radically polymerizable acids that can be employed according to the invention include any of the numerous acids known in the art which are not free radically polymerizable. Typically, acids that are not free radically polymerizable do not comprise carbon-carbon double bonds and may be either organic or inorganic. Examples of suitable non-free radically polymerizable acids include, but are not limited to, acetic acid, hexanoic acid, phenyl undecanoic acid, stearic acid, hydrochloric acid, sulfuric acid or mixtures thereof. Currently, the preferred non-free radically polymerizable acid is sulfuric acid due to the excellent results achieved therewith.

Broadly, the non-free radically polymerizable acid is provided in an amount sufficient to give a pH of less than about 6, preferably less than about 4, in the resulting polymerization reaction mixture as measured using a pH meter.

Except as provided above in the case where the ionic monomer is formed in situ, the non-free radically polymerizable acid can be added to the polymerization reaction mixture any time prior to achieving about 95% conversion, preferably about 90% conversion, of the non-ionic monomer. It is currently preferred to add the non-free radically polymerizable acid after initiation of the polymerization. For example, the non-free radically polymerizable acid can be added to the polymerization reaction mixture after achieving about 5% to about 15% conversion of the non-ionic monomer.

The polymerization reaction can be conducted in any conventional reaction vessel capable of a suspension polymerization. An example of the initial portion of a polymerization reaction temperature profile useful in the process of the invention is shown in FIG. 1. In the reaction vessel used in the polymerization of FIG. 1, the heat removal capability is such that the exothermic nature of the reaction causes the temperature of the polymerization mixture to exceed the temperature of the heat transfer fluid used to control temperature. The period during which the temperature of the polymerization mixture exceeds the temperature of the heat transfer fluid used to control temperature is referred to herein as the "exotherm". When the polymerization is conducted in a polymerization vessel using a polymerization reaction temperature profile such as the type shown in FIG. 1, it is preferred to add the non-free radically polymerizable acid during the exotherm for best adhesive transfer performance of the microspheres of the invention.

If the polymerization reaction vessel has sufficient heat removal capability such that an exotherm does not occur, it is currently preferred to add the non-free radically polymerizable acid after initiation of the polymerization.

The process(es) of the invention utilize at least one emulsifier in a concentration greater than the critical micelle concentration, defined as that minimum emulsifier concentration necessary for the formation of micelles. This concentration is slightly different for each emulsifier, usable concentrations typically ranging from about 0.0001 to about 3.0 moles/liter.

Emulsifiers, i.e. surfactants, that can be employed according to the invention include anionic, nonionic, cationic, amphoteric emulsifiers and mixtures thereof. Anionic emulsifiers are currently preferred. Examples of suitable anionic emulsifiers include, but are not limited to, alkyl aryl sulfonates (e.g. sodium dodecylbenzene sulfonate), alkyl sulfates (e.g. sodium dodecyl sulfate, ammonium dodecyl sulfate), sulfates of ethoxylated alcohols (e.g. sodium lauryl ether sulfate), sulfates and sulfonates of ethoxylated alkylphenols (e.g. sodium salt of alkylaryl polyether sulfonates), sulfosuccinates (e.g. sodium dioctyl sulfosuccinate), diphenyl sulfonates (e.g. sodium dodecyl diphenyloxide disulfonate), and mixtures thereof. Examples of suitable nonionic emulsifiers include, but are not limited to, ethoxylated alcohols (e.g. ethoxylated oleyl alcohol), ethoxylated alkylphenols (e.g. nonylphenol ethoxylate), and mixtures thereof. Examples of suitable cationic emulsifiers include, but are not limited to, ethoxylated fatty amines (e.g. ethoxylated tallow amine).

The process(es) of the invention also utilize at least one oil-soluble, very low water soluble polymerization initiator. Oil-soluble, substantially water insoluble polymerization initiators are those which are normally acceptable for free radical polymerization of acrylate monomers and are well known in the art. The typical concentration of oil-soluble, substantially water insoluble polymerization initiators is about 0.1 weight percent to about 10 weight percent, preferably about 0.1 weight percent to about 5 weight percent of the total weight of the non-ionic and ionic monomers charged to the polymerization.

Oil-soluble, substantially water insoluble polymerization initiators that can be employed according to the invention include azo compounds, peroxides, and the like, and mixtures thereof. Examples of azo compounds include, but are not limited to, 2,2'-azobisisobutyronitrile (VAZO 64 from E.I. duPont de Nemours and Company), 2,2'-azobis(2-methylbutyronitrile) (VAZO 67 from E.I. duPont de Nemours and Company), and mixtures thereof. Examples of peroxides include, but are not limited to, benzoyl peroxide (Cadet BPO from Akzo Nobel Chemicals Inc.), di-(2-ethylhexyl) peroxydicarbonate (Trigonox EHP from Akzo Nobel Chemicals Inc.), and mixtures thereof.

The oil-soluble, substantially water insoluble polymerization initiator can be added to the polymerizable aqueous emulsion and polymerization initiated before or after the non-free radically polymerizable acid is contacted with the polymerizable aqueous emulsion. It is currently preferred that the oil-soluble, substantially water insoluble polymerization initiator be added and polymerization initiated prior to contacting the non-free radically polymerizable acid with the polymerizable aqueous emulsion.

The polymerization can be initiated by any conventional method known to those skilled in the art, such as by application of heat or radiation. The method of initiation will be dependent on the oil-soluble, substantially water insoluble polymerization initiator used and will be readily apparent to those skilled in the art.

The process(es) of the invention optionally utilize at least one water soluble initiator. Such water soluble polymerization initiators are well known in the art. The water soluble polymerization initiators can be used alone or used in combination with one or more conventional reducing agents, such as bisulfites, metabisulfites, ascorbic acid, sodium formaldehyde sulfoxylate, ferrous sulfate, ferrous ammonium sulfate, ferric ethylenediamine-tetraacetic acid, and the like. The concentration of water soluble polymerization initiators utilized in the process(es) of the invention is the amount effective to further reduce the residual unconverted water soluble ionic monomer. Typically, the concentration of water soluble polymerization initiators is about 0.04 to about 5 weight percent, preferably about 0.05 to about 2 weight percent, of the total weight of the non-ionic and ionic monomers charged to the polymerization.

Water soluble polymerization initiators that can be employed according to the invention include water soluble persulfates, peroxides, azo compounds and the like, and mixtures thereof. Examples of water soluble initiators include, but are not limited to, persulfates (e.g. potassium persulfate, and sodium persulfate), peroxides (e.g. hydrogen peroxide, and tert-butyl hydroperoxide), and azo compounds (e.g. 4,4'-azobis(4-cyano-pentanoic acid), V-501 from Wako Chemicals). Currently the preferred water soluble polymerization initiators are the persulfates, particularly potassium persulfate.

The water soluble polymerization initiator can be added to the polymerization mixture after achieving about 90%, preferably about 95%, conversion of the non-ionic monomer. When the polymerization is conducted in a polymerization vessel using a polymerization reaction temperature profile such as the type shown in FIG. 1, the water soluble polymerization initiator can be added after the exotherm.

Water is used to prepare the polymerizable aqueous emulsion utilized in the process(es) of the invention. While not required, it is currently preferred to use water having low ionic content.

The polymerization temperature will be dependent on the choice of oil-soluble, substantially water insoluble polymerization initiator and the method of initiation, and will be readily apparent to those skilled in the art. For example, when benzoyl peroxide is used as the oil-soluble, substantially water insoluble polymerization initiator, the polymerization temperature is typically in the range of about 60° C. to about 90° C.

The polymerization time is that time needed to achieve the desired conversion based on the other reaction conditions, e.g. temperature profile, and reaction components, e.g. monomers, initiator, etc. The polymerization time will be readily apparent to those skilled in the art.

The polymerization is preferably conducted at atmospheric pressure under an inert atmosphere. Suitable inert gases include nitrogen, argon, carbon dioxide, helium, krypton, xenon, and neon, with nitrogen being preferred. However, the polymerization can be conducted at elevated pressure if desired. While the polymerization could be conducted under an oxygen-containing atmosphere, this is not preferred since the presence of oxygen inhibits polymerization. If the polymerization mixture contains oxygen, it must be expelled or consumed before the polymerization reaction can initiate.

Following polymerization, the aqueous suspension of copolymer microspheres is stable to agglomeration or coagulation under room temperature conditions. The copolymer microsphere suspensions typically have solids content of from about 10 to about 50 weight percent, preferably about 20 to about 40 weight percent.

Shear, as induced by agitation, is used to effectively control particle size. It is presently preferred that sufficient shear be induced to provide microspheres having an average particle size smaller than about 200 μm, preferably smaller than about 100 μm, and more preferably about 15 μm to about 50 μm. When the level of shear is too high, there is tendency for the formed particles to be so fine that on application to a substrate at moderate coat weights it will perform like a continuous film. If the microspheres are too small, higher adhesions and adhesion buildup occurs. If shear is too low, particles of too great a size will be formed. If the microspheres are too large, increased adhesive transfer occurs. Preferably shear rates sufficient to provide microspheres having average particle size smaller than about 200 μm should be used.

Any conventional recovery technique known to those of skill in the art can be utilized to recover the microspheres of the invention or the aqueous dispersion of microspheres can be used directly from the final polymerization reaction mixture. It is currently preferred to directly use the aqueous dispersion of microspheres from the final polymerization reaction mixture to provide inherently tacky pressure sensitive adhesive microspheres.

EXAMPLES

Test Methods

Sample Preparation

Each of the experimental suspension batches were coated directly onto the dull side of 60# Kromekote paper. Each casting was dried immediately in a 90° C. circulating oven for 5 minutes and closed to release liner. The coatweight of each sample was measured. The targeted coatweight was 0.6±0.1 mils. The castings were conditioned in a constant temperature and humidity room (72±2° F., 50±2% RH) for one hour prior to testing. Two sample strips, 1"×11", were cut from each casting.

Peel Adhesion

Peel adhesion is the force required to remove a coated flexible sheet material from a test panel measured at a specific angle and rate of removal. In the examples, this force was expressed in pounds per inch width of coated sheet. The procedure was as follows.

A strip 1.0 inch in width of the coated paper sheet was applied to the horizontal surface of the shiny side of 60# Kromekote paper 'panels' with 5.5 lineal inches in firm contact with the surface. A four pound rubber roller was used to apply each strip to the paper 'panels'. The roller passed twice over each strip at a rate of 12 inches per minute. The strips were allowed to wet out the surface for twenty minutes prior to testing. The free end of the coated strip was doubled back nearly touching itself so that the angle of removal was 180°. The free end of the strip was clamped into the moving jaw of the Instron Model 1125 test machine while the paper test 'panel' backed with a stainless steel test panel was securely clamped in the stationary jaw of the Instron. The strip was removed from the panel at a rate of 12 inches per minute. The scale reading in pounds was recorded as the sample strip was peeled from the panel surface. The data was reported as the average of the range of numbers observed during the test.

Microsphere Transfer

The contact area between each strip and panel was visually inspected after each strip was removed from the panel. First, the panel was inspected for the presence of microspheres on its surface. If microspheres were present, the percent surface area of coverage was estimated. Finally, the coated surface of the paper strip was inspected for presence of microspheres. If microspheres remained on the coated surface, the percent microsphere transfer was adjusted to reflect the amount of microspheres remaining on the coated paper surface. A rating of 100 percent microsphere transfer indicated that none of the microspheres remained on the coated surface, whereas, a rating of zero percent microsphere transfer indicated that none of the microspheres were found on the test panel surface. Ratings in between these two values indicated that there was some level of microsphere transfer to the test panel. One of the objects of the invention is to minimize the microsphere transfer to the test panel surface.

Abbreviations and Tradenames

SDBS: sodium dodecyl benzene sulfonate; Rhodacal DS-4 (22% solids solution) from Rhone-Poulenc
SDS: sodium dodecyl sulfate; Rhodapon SB (30% solids solution) from Rhone-Poulenc
ADS: ammonium dodecyl sulfate; Rhodapon L-22 (28% solids solution) from Rhone-Poulenc
BPO: benzoyl peroxide; Cadet BPO-78 (78% active) from Akzo Nobel Chemicals Inc.
$NH_4OH$: Ammonium hydroxide (28%); Sigma-Aldrich Co.
NaOH: Sodium hydroxide (15%); Fisher Scientific
HOAC: Acetic acid; Sigma-Aldrich Co.

Example 1 (Control)

A two liter resin reactor equipped with a mechanical stirrer, a condenser, a thermocouple probe and a gas inlet port was charged with a solution of 740 grams of deionized water and 5 grams of acrylic acid (AA) neutralized with 5 grams of ammonium hydroxide (28%) to pH 8.5. In a separate container, 1.0 gram of benzoyl peroxide (BPO) was dissolved in 245 grams of 2-ethyl hexyl acrylate (2-EHA) and then added to the reactor. The agitation was set at 320 rpm. The solution was purged with nitrogen for fifteen minutes after which the nitrogen line was repositioned above the fluid for the remainder of the reaction. Finally, 22.7 grams of SDBS were added to the reactor. After 15 minutes of mixing, the reaction mixture was heated to 65° C. and held for the first hour. At a heating rate of approximately 2.2° C. per minute, the reaction became exothermic after 20 minutes and subsided after approximately another 20 minutes. The reaction mixture was then heated to 77° C. and held for the next two hours and then heated to 88° C. and held for the final two hours.

The reaction mixture was subsequently cooled to room temperature and filtered through a 400 micron nylon mesh filter. Very little coagulum was found to be present. The resulting suspension was found to contain 260 ppm residual 2-EHA and 5176 ppm residual AA. Based on these results, essentially all of the AA was unreacted. The twenty minute peel performance (PL20) on 60# Kromekote paper was 0.52 lbs./in. with 100% bead transfer.

Examples 2–4 (Controls)

Example 1 was duplicated using the following monomers, catalysts and surfactants with similar results. The reagents and results are summarized in Tables 1 and 2.

Example 5 (Control)

(U.S. Pat. No. 5,578,650)

A two liter resin reactor equipped with a mechanical stirrer, a condenser, a thermocouple probe and a gas inlet port was charged with 750 grams of deionized water and 10 grams of ADS. The aqueous solution was stirred at 350 rpm and heated to 65° C. In a separate container, 1.1 grams of BPO was dissolved in 245 grams 2-EHA and 5 grams of acetic acid. The mixture was added to the hot aqueous solution while stirring at 350 rpm. The pH was determined to be 2.9. The temperature of the reactor was reduced to a polymerization temperature of 60° C. and the reactor was degassed with nitrogen. After 8 hours at 60° C., the reaction was cooled to 25° C. and filtered through a 400 micron nylon mesh filter. Very little coagulum was found to be present. The twenty minute peel performance (PL20) on 60# Kromekote paper was 0.38 lbs./in. with 100% bead transfer.

The reagents and results are summarized in Tables 1 and 2.

TABLE 1

| Example | Monomers | Catalyst | Surfactant |
|---|---|---|---|
| 1c | 245 g 2-EHA<br>5 g AA-$NH_4^+$ | 1.0 g BPO | 22.7 g SDBS |
| 2c | 245 g 2-EHA<br>5 g AA-$NH_4^+$ | 1.0 g BPO | 17.8 g ADS |
| 3c | 240 g 2-EHA<br>10 g AA-$NH_4^+$ | 1.0 g BPO | 10.0 g SDS |
| 4c | 235 g 2-EHA<br>15 g AA-$NH_4^+$ | 1.0 g BPO<br>9.0 | 9.0 g SDBS<br>g ADS |
| 5c | 245 g 2-EHA<br>5 g HOAc | 1.1 g BPO | 10.0 g ADS | c = control

TABLE 2

| Ex | Residual 2-EHA (ppm) | Residual AA (lb./in.) | Particle Morphology (%) | PL20 Paper | Bead Transfer (ppm) |
|---|---|---|---|---|---|
| 1c | 260 | 5176 | Solid | 0.52 | 100 |
| 2c | 227 | 4981 | Solid | 0.33 | 100 |
| 3c | 229 | 10825 | Solid | 0.35 | 100 |
| 4c | 431 | 14055 | Solid | 0.58 | 100 |
| 5c | ND | ND | Porous | 0.38 | 100 | c = control
ND = not determined

Examples 6–11

The procedure of Example 1 was duplicated using the following monomers, catalysts, surfactants and post-adds with different results. Post additions of potassium persulfate were made when the reaction was heated to 88° C., i.e. after the exotherm. All other post additions were made as indicated. The reagents and results are summarized in Tables 3 and 4. Examples 7–10 are examples according to the invention. Examples 6 and 11 are comparative examples.

Example 12 (Invention)

A two liter resin reactor equipped with a mechanical stirrer, a condenser, a thermocouple probe and a gas inlet port was charged with a solution of 740 grams of deionized water and 5 grams of acrylic acid (AA) neutralized with 19.5 grams of sodium hydroxide (15%) to pH 8.5 and then acidified with 3.5 grams of sulfuric acid. In a separate container, 1.0 gram of BPO was dissolved in 245 grams of 2-EHA and then added to the reactor. The agitation was set at 320 rpm. The solution was purged with nitrogen for fifteen minutes after which the nitrogen line was repositioned above the fluid for the remainder of the reaction. Finally, 10.0 grams of ADS were added to the reactor. After 15 minutes of mixing, the reaction mixture was heated to 65° C. and held for the first hour. The reaction mixture was subsequently heated to 77° C. and held for the next two hours and then heated to 88° C. and held for the final two hours.

The reaction was cooled to room temperature and filtered through a 400 micron nylon mesh filter. Very little coagulum was found to be present. The twenty minute peel performance (PL20) on 60# Kromekote paper was 0.53 lbs./in. with 10% bead transfer. The reagents and results are summarized in Tables 3 and 4.

TABLE 3

| Ex. | Monomers | Catalyst | Emulsifier | Post-Adds |
|---|---|---|---|---|
| 6 com | 245 g 2-EHA<br>5 g AA-NH$_4^+$ | 1.0 g BPO | 17.8 g ADS | 0.2 g PPS-after exotherm |
| 7 inv | 245 g 2-EHA<br>5 g AA-NH$_4^+$ | 1.0 g BPO | 17.8 g ADS | 3.5 g H$_2$SO$_4$<br>Before exotherm |
| 8 inv | 235 g 2-EHA<br>15 g AA-NH$_4^+$ | 1.0 g BPO | 9.0 g SDBS | 0.2 g PPS-after exotherm<br>9.0 g ADS<br>10.5 g H$_2$SO$_4$<br>During exotherm |
| 9 inv | 245 g 2-EHA<br>5 g AA-NH$_4^+$ | 1.0 g BPO | 17.8 g ADS | 3.5 g H$_2$SO$_4$<br>During exotherm |
| 10 inv | 240 g 2-EHA<br>10 g AA-NH$_4$+ | 1.0 g BPO | 10.0 g SDS | 0.2 g PPS-after exotherm<br>7.0 g H$_2$SO$_4$<br>During exotherm |
| 11 com | 245 g 2-EHA<br>5 g AA-NH$_4^+$ | 1.0 g BPO | 17.8 g ADS | 3.5 g H$_2$SO$_4$<br>After exotherm |
| 12 inv | 245 g 2-EHA<br>5 g AA-Na$^+$ | 1.0 g BPO | 10.0 g ADS | 3.5 g H$_2$SO$_4$<br>Before exotherm | com = comparative example
inv = invention

TABLE 4

| Ex | Residual 2-EHA (ppm) | Residual AA (lb./in.) | Particle Morphology (%) | PL20 Paper | Bead Transfer (ppm) |
|---|---|---|---|---|---|
| 6 com | 248 | 3701 | Solid | 0.63 | 100 |
| 7 inv | 285 | 1585 | Solid | 0.53 | 30 |
| 8 inv | 324 | 590 | Solid | 0.61 | 0 |
| 9 inv | 350 | 1500 | Solid | 0.67 | 5 |
| 10 inv | 439 | 808 | Solid | 0.68 | 5 |
| 11 com | 368 | 1481 | Solid | 0.56 | 100 |
| 12 inv | ND | ND | Solid | 0.53 | 10 | com = comparative example
inv = invention
ND = not determined

The results of Examples 7–10 and 12 compared to Examples 1–6 and 11 clearly demonstrate that the process of the invention produces solid polymer microspheres having significantly improved microsphere adhesive transfer. The results of Example 7 compared to Examples 1 and 2 clearly demonstrates that use of the non-free radically polymerizable acid according to the process of the invention significantly reduces the residual ionic monomer content. The results of Examples 8 and 10 compared to Examples 4 and 3 clearly demonstrate that use of the non-free radically polymerizable acid in conjunction with the water soluble initiator according to a process of the invention further significantly reduces the residual ionic monomer content while having significantly improved microsphere adhesive transfer. The results of comparative Example 11 demonstrate that addition of the non-free radically polymerizable acid after the exotherm results in solid polymer microspheres having poor microsphere adhesive transfer performance properties. The results of comparative Example 6 demonstrate that addition of the water soluble initiator without use of the non-free radically polymerizable acid reduces the residual ionic monomer content but results in solid polymer microspheres having poor microsphere adhesive transfer performance properties.

We claim:

1. A process for preparing solid polymeric pressure sensitive adhesive microspheres comprising:

(a) contacting a polymerizable aqueous emulsion of at least one non-ionic monomer of an alkyl acrylate or alkyl methacrylate ester of a non-tertiary alcohol and at least one ionic monomer copolymerizable with said non-ionic monomer and at least one non-free radically polymerizable acid, wherein said non-free radically polymerizable acid is contacted with said (b) polymerizable aqueous emulsion prior to achieving about 95% conversion of said non-ionic monomer; and
    polymerizing the emulsion to form an aqueous suspension of said solid polymeric pressure sensitive adhesive microspheres;
    wherein said non-free radically polymerizable acid is sulfuric acid.

2. The process of claim 1 further comprising adding a water soluble initiator to the polymerization mixture after achieving about 90% conversion of said non-ionic monomer.

* * * * *